(12) United States Patent
Ng et al.

(10) Patent No.: US 9,710,565 B2
(45) Date of Patent: *Jul. 18, 2017

(54) INTEROPERABLE SOCIAL SERVICES

(71) Applicant: International Business Machines Corporation, Armonk, NY (US)

(72) Inventors: Joanna W. Ng, Unionville (CA); Diana Lau, Richmond Hill (CA); Arthur G. Ryman, Thornhill (CA); Timothy M. Francis, Newmarket (CA)

(73) Assignee: International Business Machines Corporation, Armonk, NY (US)

( * ) Notice: Subject to any disclaimer, the term of this patent is extended or adjusted under 35 U.S.C. 154(b) by 423 days.

This patent is subject to a terminal disclaimer.

(21) Appl. No.: 14/315,692

(22) Filed: Jun. 26, 2014

(65) Prior Publication Data

US 2015/0081697 A1   Mar. 19, 2015

Related U.S. Application Data

(63) Continuation of application No. 14/026,493, filed on Sep. 13, 2013.

(51) Int. Cl.
*H04L 29/06* (2006.01)
*G06F 17/30* (2006.01)
(Continued)

(52) U.S. Cl.
CPC ....... *G06F 17/30876* (2013.01); *G06Q 50/01* (2013.01); *H04L 12/18* (2013.01); *H04L 51/32* (2013.01); *H04L 65/403* (2013.01)

(58) Field of Classification Search
None
See application file for complete search history.

(56) References Cited

U.S. PATENT DOCUMENTS

| 7,069,308 B2 | 6/2006 | Abrams |
| 7,933,810 B2 | 4/2011 | Morgenstern |

(Continued)

FOREIGN PATENT DOCUMENTS

WO    2009086443 A1    7/2009

OTHER PUBLICATIONS

Gift Boogle, Inc., A Collaborative Gift-Giving Network, retrieved on Jun. 13, 2013 from website: <http://www.giftboogle.com/site/privacy/>.

(Continued)

*Primary Examiner* — Natisha Cox
(74) *Attorney, Agent, or Firm* — Edward J. Wixted, III

(57) ABSTRACT

In a method for utilizing multiple social computing services of a user, a processor accesses a first networking service of a user and a second networking service of the user, wherein the first networking service includes a first group of contacts connected with the user and the second networking service includes a second group of contacts connected with the user. A processor retrieves the first group from the first networking service and the second group from the second networking service. A processor creates a set of contacts, wherein the set of contacts includes each contact of the first group of contacts with a corresponding link to information about that contact, and each contact of the second group of contacts with a corresponding link to information about that contact, and wherein a contact of the set of contacts has an associated relationship, established externally from either networking service, with the user.

7 Claims, 5 Drawing Sheets

(51) Int. Cl.
*G06Q 50/00* (2012.01)
*H04L 12/18* (2006.01)
*H04L 12/58* (2006.01)

(56) References Cited

U.S. PATENT DOCUMENTS

| | | | |
|---|---|---|---|
| 8,739,016 B1 | 5/2014 | Goldman et al. | |
| 8,887,070 B1* | 11/2014 | Hecht | H04M 3/56 379/202.01 |
| 9,098,819 B1* | 8/2015 | Korula | G06Q 10/0635 |
| 2002/0065741 A1* | 5/2002 | Baum | G03D 15/005 705/26.5 |
| 2005/0216444 A1 | 9/2005 | Ritter et al. | |
| 2008/0271425 A1* | 11/2008 | Ricketts | A01D 41/16 56/15.6 |
| 2009/0171739 A1 | 7/2009 | De et al. | |
| 2010/0023341 A1 | 1/2010 | Ledbetter et al. | |
| 2011/0035673 A1* | 2/2011 | Chou | G06F 15/16 715/739 |
| 2011/0119230 A1 | 5/2011 | Zuber | |
| 2011/0258203 A1 | 10/2011 | Wouhaybi et al. | |
| 2011/0307455 A1 | 12/2011 | Gupta et al. | |
| 2012/0150605 A1 | 6/2012 | Isaacson et al. | |
| 2012/0158935 A1 | 6/2012 | Kishimoto et al. | |
| 2012/0233701 A1 | 9/2012 | Kidron | |
| 2012/0324027 A1 | 12/2012 | Vaynblat et al. | |
| 2013/0006779 A1 | 1/2013 | Belluomini | |
| 2013/0073430 A1 | 3/2013 | Gallen et al. | |
| 2013/0080524 A1 | 3/2013 | Rubinstein et al. | |
| 2013/0117151 A1 | 5/2013 | Macaisa et al. | |
| 2013/0217366 A1 | 8/2013 | Kolodziej | |
| 2013/0268391 A1 | 10/2013 | Esch et al. | |
| 2013/0332308 A1 | 12/2013 | Linden et al. | |
| 2014/0052742 A1* | 2/2014 | Deng | G06F 17/30386 707/752 |

OTHER PUBLICATIONS

U.S. Appl. No. 14/315,868 entitled "Smart Social Gifting" filed Jun. 26, 2014.

Mislove et al., "You Are Who You Know: Inferring User Profiles in online Social Networks", Max-Planck Institute for Software Systems, WSDM, Feb. 4-6, 2010, New York City, NY USA, retrieved from website: http://www.mpi-sws.org/~gummadi/papers/inferring_profiles.pdf.

Oh et al., "A Social Network Extraction Based on Relation Analysis", ICUIMC'12 Proceedings of the 6th International Conference on Ubiquitous Information Management and Communication Article No. 44, New York, NY, 2012, retrieved from website: http://dl.acm.org/citation.cfm?id=2184805.

Chard et al., "Social Cloud: Cloud Computing in Social Networks", Karlsruhe Institute of Technology, Germany, Apr. 2010, retrieved from website: http://www.ksri.kit.edu/Upload/Publications/afce0bb-d437-49dc-bf6d-a94303409870.pdf.

U.S. Appl. No. 14/026,493 entitled "Interoperable Social Services" filed Sep. 13, 2013.

International Search Report with Written Opinion; Application No. PCT/CA2014/050592; Filed Jun. 23, 2014.

Business Wire, Giving Gifts Gets Smarter, Faster and Easier with Webgiftr, Business Wire, Nov. 12, 2008.

Darwell, Brittany, Facebook launches Facebook Gifts for users to buy friends real gifts through mobile and desktop, Inside Facebook, Sep. 27, 2012.

Expert commentator, A briefing on social gifting, Smart Insights, Jul. 30, 2012.

Yarow, Jay. This is Facebook's Secret Weapon for Making a Lot More Money, Business Insider, May 24, 2012.

U.S. Appl. No. 14/026,571 entitled "Smart Social Gifting" filed Sep. 13, 2013.

\* cited by examiner

INTEROPERABLE SOCIAL SERVICES

FIELD OF THE INVENTION

The present invention relates generally to the field of social computing, and more particularly to interoperable social services that can access and use information from various social networking platforms to enhance enterprise web services.

BACKGROUND OF THE INVENTION

Online social networks are well known, and examples include LinkedIn®, Google+®, Facebook®, and various additional online social utilities that support social networking. Such social networks can grow as their members discover and connect with other people who have similar interests or experiences.

Social networks track and enable connections between their members (including people, businesses, and other entities). In particular, social networking websites allow their members to efficiently communicate information that is relevant to friends or other connections on the social network. Social networks typically incorporate a system for maintaining connections among members in the social network and for maintaining links to content that is likely to be relevant to the members. Social networks also connect and maintain information about their members. This information may be substantially static, such as employer, job type, age, music preferences, interests, and a variety of other attributes, or it may be more dynamic, such as a member's geographic location within a city, or his or her actions within the social network.

A typical modern computer-implemented social networking application allows each member to provide some biographical and contact information, to identify his or her interests, and to make social networking posts about his or her status and daily life. Social networks can also suggest to the member other members whom the user might know, or other members with compatible interests. Some social networks allow users to define relationships between the user and their connections. For example, a user may designate another contact as their brother, friend, or co-worker. While these defined relationships exist within the social network, the information is not currently used by outside applications.

Typically, when a member of a social network wishes to share information with other members of the social network, the member uploads or copies and pastes the information to a location on the social network as a social networking post, or sends the information in the form of a private message or email to other members.

An ontology formally represents knowledge as a set of concepts within a domain, and the relationships between pairs of concepts. An ontology provides a shared vocabulary, which can be used to model a domain, that is, the type of objects and/or concepts that exist, and their properties and relations. Ontologies create a structural framework for organizing information and are used in artificial intelligence, the semantic web, and other areas as a form of knowledge representation about the world or some part of it.

The semantic web is a standard that promotes common data formats on the internet. The semantic web provides a common framework that allows data to be shared and reused across application, enterprise, and community boundary. The semantic web involves publishing in languages specifically designed for data: Resource Description Framework (RDF, Web Ontology Language (OWL), and Extensible Markup Language (XML). HTML describes documents and the links between them. RDF, OWL, and XML, by contrast, can describe arbitrary things such as people, meetings, or parts of an object or assembly. Machine-readable descriptions enable content managers to add meaning to content, i.e., to describe the structure of the knowledge we have about content. In this way, a machine can process knowledge itself, instead of text, using processes similar to human deductive reasoning and inference, thereby obtaining more meaningful results and helping computers to perform automated information gathering and research.

SUMMARY

Aspects of an embodiment of the present invention disclose a method, computer program product, and computing system for utilizing multiple social computing services of a user. A processor accesses a first networking service of a user and a second networking service of the user, wherein the first networking service includes a first group of contacts connected with the user and the second networking service includes a second group of contacts connected with the user. A processor retrieves the first group from the first networking service and the second group from the second networking service. A processor creates a set of contacts, wherein the set of contacts includes each contact of the first group of contacts with a corresponding link to information about that contact, and each contact of the second group of contacts with a corresponding link to information about that contact, and wherein a contact of the set of contacts has an associated relationship with the user, wherein the associated relationship with the user is established externally from the first networking service and the second networking service.

DETAILED DESCRIPTION

Figure 1:
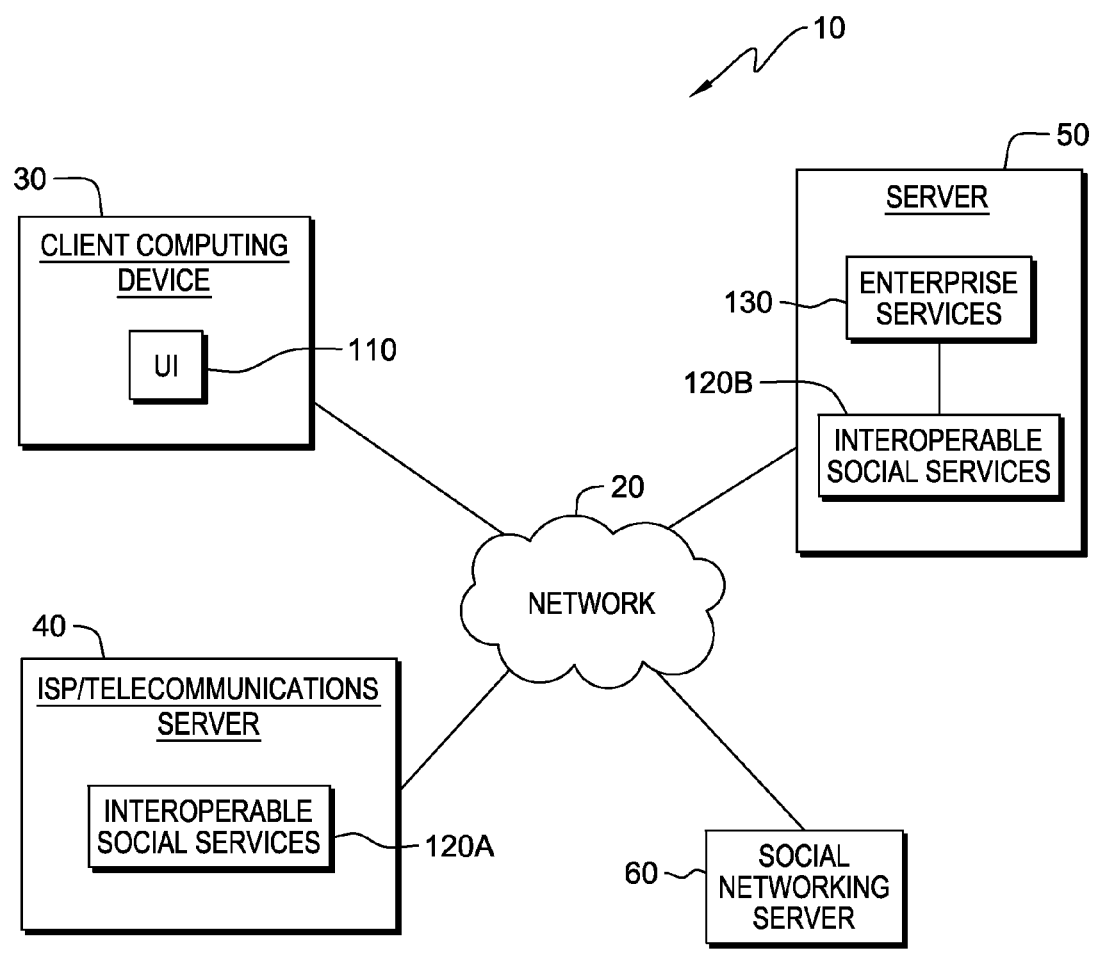
FIG. 1 depicts a diagram of a computing system in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures.

FIG. 1 depicts a diagram of computing system 10 in accordance with one embodiment of the present invention. FIG. 1 provides only an illustration of one embodiment and does not imply any limitations with regard to the environments in which different embodiments may be implemented.

In the depicted embodiment, computing system 10 includes client computing device 30, internet service providers (ISP)/telecommunications server 40, server 50, and social networking server 60 interconnected over network 20. Network 20 may be a local area network (LAN), a wide area network (WAN) such as the Internet, a cellular data network, any combination thereof, or any combination of connections and protocols that will support communication between client computing device 30, ISP/telecommunications server 40, server 50, and/or social networking server 60 in accordance with embodiments of the invention. Network 20 may include wired, wireless, or fiber optic connections. Computing system 10 may include additional computing devices, servers, computers, or other devices not shown.

Client computing device 30 may be a desktop computer, laptop computer, netbook computer, tablet computer, personal digital assistant (PDA), or smart phone. In general, client computing device 30 may be any electronic device or computing system capable of sending and receiving data, and communicating with ISP/telecommunications server 40, server 50, and/or social networking server 60 over network 20. Client computing device 30 contains user interface (UI) 110. Client computing device 30 may include components, as depicted and described in further detail with respect to FIG. 5.

ISP/telecommunications server 40 may be a management server, a web server, or any other electronic device or computing system capable of receiving and sending data. ISP/telecommunications server 40 may be any programmable electronic device capable of communicating with client computing device 30, server 50, and/or social networking server 60 via network 20. In other embodiments, ISP/telecommunications server 40 may represent a server computing system utilizing multiple computers as a server system, such as in a cloud computing environment. ISP/telecommunications server 40 may optionally contain interoperable social services 120A. In one embodiment, ISP/telecommunications server 40 is only accessible to a client computing device, such as client computing device 30, when the client computing device is connected to network 20 through a network owned and/or operated by the ISP or telecommunications company that owns and/or operates ISP/telecommunications server 40. In another embodiment, ISP/telecommunications server 40 may be accessible to client computing device 30 via a connection from another ISP or another telecommunications company. ISP/telecommunications server 40 may include components, as depicted and described in further detail with respect to FIG. 5.

Server 50 may be a management server, a web server, or any other electronic device or computing system capable of sending and receiving data. In some embodiments, server 50 may be a laptop computer, tablet computer, netbook computer, personal computer (PC), a desktop computer a personal digital assistant (PDA), a smart phone, or any programmable electronic device capable of communicating with client computing device 30, ISP/telecommunications server 40, and/or social networking server 60 via network 20. In other embodiments, server 50 may represent a server computing system utilizing multiple computers as a server system, such as in a cloud computing environment. Server 50 may be an enterprise server capable of providing any number of a variety of services to a large number of users. Server 50 contains enterprise services 130 and interoperable social services 120B. Server 50 may include components, as depicted and described in further detail with respect to FIG. 5.

Social networking server 60 may be a management server, a web server, or any other electronic device capable of receiving and sending data. In another embodiment, social networking server 60 may represent a server computing system utilizing multiple computers as a server system, such as in a cloud computing environment. Social networking server 60 may host a social networking platform, professional networking platform, email service, or contact list capable of providing contact information or other information about a "friend," or other social networking connection. In one embodiment, social networking server 60 may be a server for a social networking company that provides social network users with an ability to establish connections with other users of the same social network. Connected users may be able to view contact, interest, relationship, employment, or other information that is shared with the user by each respective connection.

UI 110 operates on client computing device 30 to visualize content from interoperable social services 120B, enterprise services 130, and optionally from interoperable social services 120A. UI 110 allows a user to view and input information to allow the user to take advantage of the services provided by interoperable social services 120B, enterprise services 130, and optionally from interoperable social services 120A and other services not shown. UI 110 may include one or more interfaces such as an operating system interface and one or more application interfaces. In one embodiment, UI 110 communicates with interoperable social services 120B, enterprise services 130, and optionally with interoperable social services 120A through one or more application interfaces. In another embodiment, UI 110 may reside on another electronic device or computing system, provided that UI 110 can communicate with interoperable social services 120A, interoperable social services 120B, and/or enterprise services 130.

Interoperable social services, such as interoperable social services 120A and 120B are a set of software and/or hardware components that may be installed to or otherwise included within a server, such as ISP/telecommunications server 40 or server 50. Interoperable social services, such as interoperable social services 120A and 120B operate to access social networking contact information of a user, combine contacts from one or multiple social networking accounts, such as social networking server 60, into a single contact aggregate, define relationships between a user and one or more contact aggregates, and allow for enterprise service hosts to access and use this information to better perform enterprise services for a given user. Interoperable social services, such as interoperable social services 120A and 120B may also operate to define relationships between multiple contact aggregates. A contact aggregate contains one or more entries from social networks of a user, such as social networking server 60, that represent a single unique individual contact. For example, an individual contact may have profiles on two social networks, and the contact aggregate for that individual will contain information from each social network within the single contact aggregate. In the current embodiment, interoperable social services 120A resides on ISP/telecommunications server 40 and interoperable social services 120B resides on server 50. Interoperable social services, such as interoperable social services 120A and 120B will be discussed in further detail with regards to FIG. 2.

Enterprise services 130 operates to provide services to users attempting to access server 50. The nature of the services represented by enterprise services 130 depends upon the services provided by server 50. In one embodiment, server 50 may be an online retailer server, and enterprise services 130 may include buying and selling goods, creating wish lists, storing items in a cart for later purchase, reviewing products, or sharing this type of information with other individuals. In another embodiment, server 50 may be an email server, and enterprise services 130 may include sending and receiving emails, importing and exporting contact lists, managing appointments on a calendar, and other related services. In another embodiment, server 50 may be business server, and enterprise services 120 may include services for business process management, such as calls for bids, approvals, or requests for quotes. In yet another embodiment, server 50 may be a social networking server, and enterprise services 130 may include creating or updating profiles, connecting with other users on the social network, or other social network activities. In general, enterprise services 130 may include any actions or services provided by an enterprise to a user, such as a user at client computing device 30. In one embodiment, enterprise services 130 resides on server 50. In other embodiments, enterprise services 130 may reside on another server or another computing device, provided that enterprise services 130 is accessible to client computing device 30 through UI 110 and interoperable social services 120B, and provided that enterprise services 130 has access to interoperable social services 120B.

Figure 2:
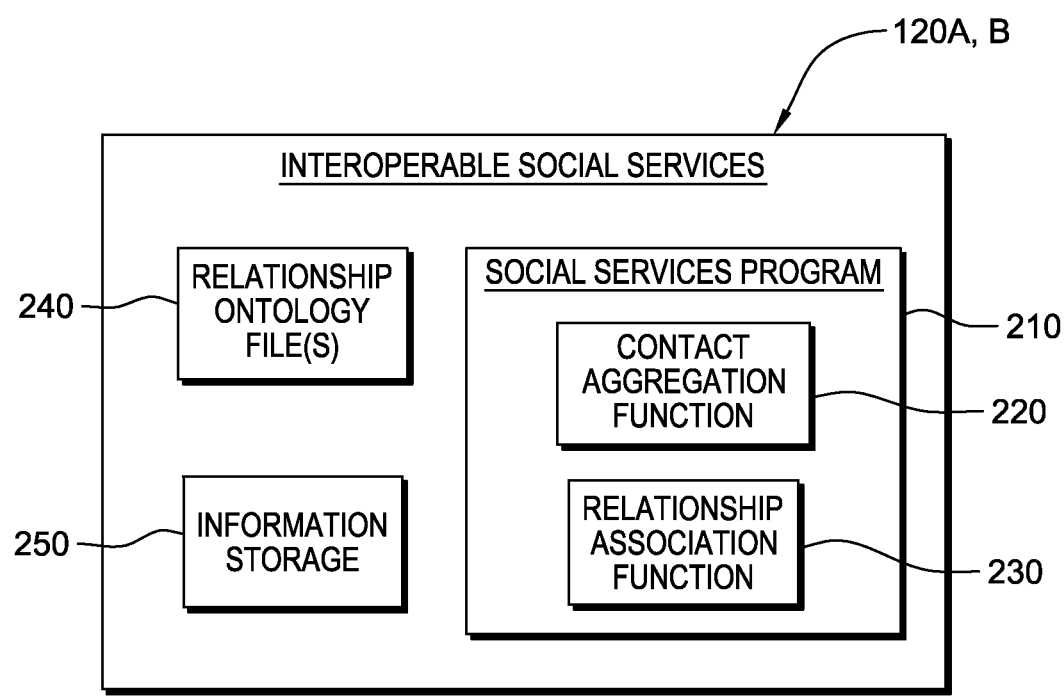
FIG. 2 depicts a diagram of interoperable social services in accordance with one embodiment of the present invention.

FIG. 2 depicts a diagram of interoperable social services 120A and 120B in accordance with one embodiment of the present invention. In the depicted embodiment, interoperable social services 120A resides on ISP/telecommunications server 40 and interoperable social services 120B resides on server 50. FIG. 2 provides an illustration of one embodiment and does not imply any limitations with regard to the environments in which different embodiments may be implemented.

In the depicted embodiment, interoperable social services 120A and 120B each include the same software and components. In other embodiments, interoperable social services 120A, 120B, and other instances of interoperable social services may contain different sets of software or components. In the depicted embodiment, interoperable social services 120A and 120B include social services program 210, contact aggregation function 220, relationship association function 230, relationship ontology file(s) 240, and information storage 250. As previously mentioned, interoperable social services 120A, 120B may include additional components and software.

Social services program 210 operates to get information from the user's identified social networking sources in order to determine one or more social networking sources, such as social networking server 60, to interoperate with for the user. Social services program 210 accesses the user's social networking contact information from the user's identified social networking source, such as social networking server 60, through each of the user's corresponding social network accounts, such as social networking server 60. Social services program 210 may then retrieve all entries of contacts of the user from each identified social networking server, such as social networking server 60. Social services program 210 may retrieve information about the entries of contacts of the user from each identified social networking server, and maintain that information via a corresponding link to information about that contact. In some embodiments, the corresponding link may be to the source of the information, such as the social networking site source, or to an externally maintained link to information about the contact. Social services program 210 may then aggregate all entries of contacts of the user, as retrieved from all social networking sources, such as social networking server 60, into a consolidated list of contact aggregates. Social services program 210 may reconcile multiple contact entries from different social networking sources, such as social networking server 60, that represent the same identity into one contact aggregate per each unique identity, by applying contact reconciliation rules. Contact reconciliation rules may include, for example, multiple contacts containing a matching first name, last name and cell phone number. Based on input received from the user or information retrieved from the social networking source, one or more relationship axioms may be associated with each contact aggregate. Axioms are assertions in a logical form that together comprise an overall theory that an ontology describes in its domain of application. Relationship axioms are assertions about relationships as used in a relationship ontology, such as a relationship file stored to relationship ontology file(s) 240. For example, a relationship axiom between a user and a contact aggregate may assert that the contact aggregate is the user's brother. The operations performed by social services program 210 may allow for enterprise service hosts to access and use additional information to better perform enterprise services for a user. Enterprise services may be any of the enterprise services discussed in FIG. 1, such as those referencing enterprise services 130 of server 50. In one embodiment, social services program 210 includes two functions: contact aggregation function 220 and relationship association function 230. In one embodiment, social services program 210 resides on the enterprise server containing the enterprise services, such as enterprise services 130, that it assists. In other embodiments, social services program 210 may reside on another server, or another computing device, provided that social services program 210 is accessible to applicable enterprise services, such as enterprise services 130, and provided that social services program 210 has access to respective relationship ontology file(s) 240, information storage 250, and applicable enterprise services.

Contact aggregation function 220 operates to retrieve information from and allow access to contact and/or user profile information stored within a variety of social media, email, and other similar connection-making platforms. In one embodiment, contact aggregation function 220 may reconcile and merge contact or profile information from multiple sources into a single contact aggregate, according to a set of contact reconciliation rules. Contact reconciliation rules may be predefined or may be customizable by a user through UI 110 on client computing device 30. In another embodiment, contact aggregation function 220 may alert and query a user at client computing device 30, through UI 110 as to retrieved contact information and profile information from multiple contact sources that may in fact be directed to the same user. For example, a person may have a profile on a first social networking platform and a profile on a second social networking platform. Contact aggregation function 220 may allow a user to designate primary message settings for each user. All contact aggregates, their corresponding sources, and units of information linked to the contact aggregates may be stored to information storage 250. Units of information linked to the contact aggregates may include facts about contacts represented by the respective contact aggregates, such as a contact's birthday. Such information may be stored in a format that is interoperable between systems equipped with interoperable social services, such as interoperable social services 120A on ISP/telecommunications server 40 and interoperable social services 120B on server 50. In one embodiment, the information may be stored in the resource description framework (RDF) as an extensible markup language (XML) file. RDF is a general method for conceptual description or modeling of information that is implemented in web resources. XML is a markup language that defines a set of rules for encoding documents in a format that is both human-readable and machine-readable.

Relationship association function 230 operates to assist enterprise services, such as enterprise services 130, at query request, to retrieve a list of contact aggregates when a specified relationship axiom is received. In one embodiment, relationship association function 230 may be able to make inferences based on relationship axioms a user previously associated with contact aggregates that are different than the specified relationship axiom of the request. For example, a user may associate the relationship axiom "sister" with a contact aggregate. When the specified relationship axiom "sibling" is used for a query that involves gathering a group of members within the group "sibling," the contact aggregate associated with the relationship axiom of "sister" will also be listed as a member of "sibling", together with other social relationship axioms (e.g. "brother"), even though the relationship ontology concept of "sister" is not specified directly in the query. This is due to the relationship definition between "sister" and "sibling" in the applicable relationship ontology, such as a relationship ontology stored to relationship ontology file(s) 240.

Relationship association function 230 may also allow a user to set one or more relationships between the user and other contacts, as well as between multiple contacts of the user. Relationships a user can set may include familial (e.g., brother, parent, cousin), employment (e.g., boss, co-worker), service (e.g., barber, electrician), geographic (e.g., neighbor, location of residence), interest, friendship-level (e.g., friend, acquaintance, significant other), or other types of relationships. Such information may be stored in a format that is interoperable between systems equipped with interoperable social services, such as interoperable social services 120A on ISP/telecommunications server 40 and interoperable social services 120B on server 50. In one embodiment, the information may be stored in the RDF as an XML file.

Relationship association function 230 may also be able to import or export the user's social networking contact aggregates, associated relationship axioms, and applicable relationship ontologies used for such associated relationship axioms. For example, relationship association function 230 may be able to externalize a copy of the user's social networking contact aggregates from a first enterprise server location to a second enterprise server location. The information that may be imported or exported is comprised of the applicable relationship ontology, such as a relationship ontology stored to relationship ontology file(s) 240 and all the user's contact aggregates that contain all contact information from each of the social network sources, such as social networking server 60. Enterprise servers, such as server 50, equipped with interoperable social services, such as interoperable social services 120A and 120B may import the user's contact aggregates, associated relationship axioms, and applicable relationship ontologies used for such associated relationship axioms as exported from another enterprise server that is equipped with interoperable social services 120A, 120B, and vice versa.

Information storage 250 is a repository that may be written and read by social services program 210, contact aggregation function 220, and relationship association function 230. Contact aggregates of each user that contain user profile graph objects, extracted user profile information, defined relationships and/or links to user profile information may be stored to information storage 250. In addition, contact reconciliation rules may be stored to information storage 250. In one embodiment, information storage resides with interoperable social services 120A, 120B. In other embodiments, information storage 250 may reside on another server or another computing device, provided that information storage 250 is accessible to social services program 210, contact aggregation function 220, relationship association function 230, and applicable enterprise services, such as enterprise services 130.

Relationship ontology file(s) 240 is a repository that may be written and read by social services program 210 and relationship association function 230. Relationship ontology file(s) 240 may contain one or more relationship ontology files. A relationship ontology file contains an ontology artifact that captures definitions of relationships for a given domain. Relationship ontology files may be written or read by social services program 210 or another ontology tooling and stored, typically in serialized form, to relationship ontology file(s) 240. In other embodiments, relationship ontology files may be stored to information storage 250. In one embodiment, relationship ontology information is stored as one or more web ontology language (OWL) files. OWL files are a type of file used by knowledge representation languages for authoring ontologies. The file-type is characterized by formal semantics and RDF/XML-based serializations for the semantic web. Relationship ontology information may contain facts, classes, subclasses, and other information about definition of truth and assertions about relationships within a given specific domain. For example, in a "personal" domain, personal relationship definition captured by relationship ontology may characterize "mother" by one or more combinations of the fact that a person "has a child," "is female," "is not male," or "is a parent." Example of other relationship ontology for another domain includes: business-to-business relationship ontology; business-to-consumer relationship ontology, etc. Relationship ontology information may help relationship association function 230 decipher inferences and recognize extended relationships based upon relationship information retrieved and input by a user. Relationship ontology file(s) 240 may comprise one or more files, and enterprise servers may utilize one or more relationship ontology file(s) 240, based on the needs of the services being performed, such as enterprise services 130. In one embodiment, relationship ontology file(s) 240 resides with the other files and components of interoperable social services 120A or 120B. In other embodiments, relationship ontology file(s) 240 may reside on another server or another computing device, provided that relationship ontology file(s) 240 is accessible to social services program 210 and relationship association function 230. In yet other embodiments, relationship ontology file(s) 240 may be uniform resource locator (URL) addressable for access by any user or entity with knowledge of the particular URL and access to the Internet. Relationships within each relationship ontology file of relationship ontology file(s) 240 may be exported and captured in a relationship axiom artifact, typically in the form of an XML file, and stored as a part of information storage 250. A relationship axiom artifact is a file that may contain at least a list of relationships as contained within the applicable relationship ontology file or files of relationship ontology file(s) 240. The relationship axiom artifact may be read by UI 110 of client computing device 30 to populate the list of relationships displayed by UI 110 for the user to associate one or more relationships with a contact aggregate.

Figure 3:
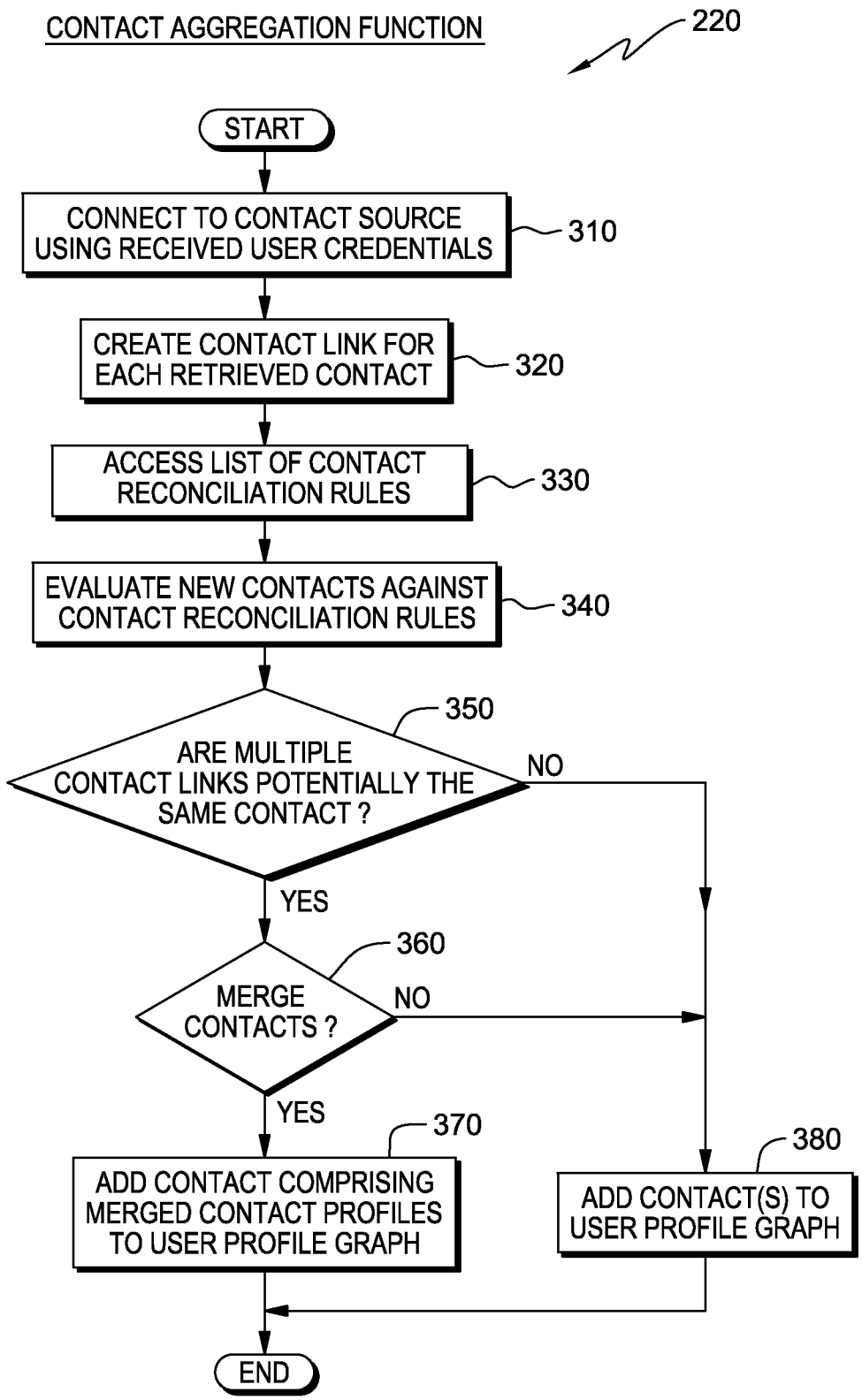
FIG. 3 depicts a flowchart of the steps of a social services program executing a contact aggregation function within the computing system of FIG. 1, for retrieving contacts from one or more sources, and merging profiles directed toward the same contact.

FIG. 3 depicts a flowchart of the steps of contact aggregation function 220 to get information from the user's identified social networking sources in order to determine one or more social networking sources, such as social networking server 60, to interoperate with for the user.

Contact aggregation function 220 is executing within the computing system of FIG. 1, for retrieving contacts from one or more social networking sources and merging profiles directed toward the same contact into a single contact aggregate, in accordance with one embodiment of the present invention.

In one embodiment, a user may have accounts with one or more email, social network, or other networking platform. For example, a user might have profiles with a professional network, a social network, and two email addresses, wherein each account has a contact list or set of connections to other users. A user at client computing device 30 may wish to use these connections to accomplish tasks and use services available outside of the confines of the applicable social networking platform(s).

A user may wish to enable an interoperable social network that will allow multiple enterprise servers to take advantage of information available to the user through their established profiles and connections on existing email and social networking programs, web sites, and/or other platforms. A user at client computing device 30 may initiate interoperable social services 120A or 120B by accessing a server with interoperable social services capabilities. For example, a user's ISP or telecommunication server, such as ISP/telecommunication server 40 may allow access to interoperable social services 120A through an application or by being connected to a network operated by the provider. Alternatively, a user may be able to access interoperable social services through an enterprise server, such as server 50 using interoperable social services 120B. A user at client computing device 30 may initiate contact aggregation function 220 through UI 110 by selecting a contact source, such as a social networking, professional networking, email, or other networking platform and inputting necessary information to allow contact aggregation function 220 to gain access to the selected contact source.

Information required to gain access to a contact source may include a username, email address, password, site address, or other information. For example, if the contact source comes from an email account, the account type (e.g., POP3, IMAP, etc.), incoming mail server and outgoing mail server (SMTP) information, and other information may additionally be necessary to allow contact aggregation function 220 the necessary access. Some embodiments of the present invention may be integrated into a contact source program, web site, or platform, and may not require additional user credential information to access the account or profile. In some embodiments, the user may be able to provide contact aggregation function 220 with access to particular connections or group of connections within the selected account, rather than all of the connections in their entirety.

Once contact aggregation function 220 has the necessary information required to access the contact source(s), in step 310, contact aggregation function 220 retrieves information from social sources by using the received user credentials. For example, the contact source may be a social networking platform run on social networking server 60, and the required user credentials may include the web site of the social networking platform, the user's username, and the password associated with the account.

In step 320, contact aggregation function 220 creates a contact link for each retrieved contact. A contact link may be a URL directed to the contact or user profile source. Additional information about the contact may be stored, such as facts about the contact listed in the profile, listed contact information, profile pictures, important dates (e.g., birthday, anniversary), and relationship information (e.g., spouse, parents, siblings, children, etc.). Alternatively, an embodiment may extract all information available through the user credentials and store the complete set of information. Other embodiments may merely store links to the particular contact. Contact information and/or links may be stored to a file or database, such as information storage 250.

Contact information may be retrieved from the contact source through the use of an application programming interface (API). In some instances, a social media website or other similar platform may provide an API. An API is intended to be used as an interface by software components to communicate with each other. Many social media platforms provide services with a corresponding API. If a social media website or other similar platform uses an API, contact aggregation function 220 may be able to call the API for specific contact details and other information, rather than relying on other processes.

If a social media platform does not use an API, an embodiment of contact aggregation function 220 may be able to use text analytics processes to extract information about contacts. In one embodiment, contact aggregation function 220 uses text analytics to parse through all available contact information and extract information based on keywords or common themes within the text of the user profile of the contact. Text analytics can be performed using an Unstructured Information Management Architecture (UIMA) application configured to analyze unstructured information to discover patterns relevant to contact aggregation function 220 by processing plain text and identifying entities or relations.

In step 330, contact aggregation function 220 accesses a list of one or more contact reconciliation rules from information storage 250. Contact reconciliation rules may help contact aggregation function 220 determine if profile information from different contact sources is directed to the same user. In some embodiments, the one or more contact reconciliation rules may be a set of default rules. In other embodiments, the one or more contact reconciliation rules may be a customized set of contact reconciliation rules created by a user for resolving whether or not profile information from different contact sources is directed at the same contact. For example, a contact reconciliation rule may state that contact aggregation function 220 should recognize a conflict if two profiles from different social network or other sources share the same birthday. In another example, a contact reconciliation rule may state that contact aggregation function 220 should recognize a conflict if the first and last initial of a user matches that of another user on another social networking platform. In yet another example, a contact reconciliation rule may state that contact aggregation function 220 should recognize a conflict if the first and last name of a user match within a certain specified threshold to that of another user on another social networking platform according to a Levenshtein distance algorithm. The Levenshtein distance between two words is the minimum number of single-character edits (e.g., insertions, deletions, substitutions) required to change one word into the other. In yet another embodiment, a contact reconciliation rule may determine a conflict by using facial recognition software to compare profile pictures from two or more contact sources. In one embodiment, contact reconciliation rules may allow contact aggregation function 220 to automatically determine whether or not user profiles from different contact sources are operated by the same person. In another embodiment, contact aggregation function 220 may alert a user at client computing device 30 when a conflict exists, such as when a user lists two different mailing addresses.

In step 340, contact aggregation function 220 evaluates newly retrieved contacts against previously stored contacts or other newly retrieved contacts, according to a set of contact reconciliation rules. If no new contact sources have been added to the user profile graph, there may be no conflicts. However, if there are multiple contact sources, contact aggregation function 220 may compare newly retrieved contacts to those linking or directed to other contact sources which are a part of the user profile graph. In one embodiment, contact aggregation function 220 individually selects each contact or contact link and compares it to stored contacts from other sources according to the applicable contact reconciliation rules (see step 320). Embodiments of contact aggregation function 220 may select new contacts to be evaluated by username or any other organized method.

In decision 350, contact aggregation function 220 determines whether two or more contacts or contact links from different contact sources are potentially directed to the same contact (i.e., the same user operates each profile in question). If contact aggregation function 220 determines that the contact is not directed to the same user as another contact from another contact source (decision 350, no branch), contact aggregation function 220 adds the contact link to the user profile graph (step 380) and stores the information to a file or database, such as information storage 250. In one embodiment, contact aggregation function 220 may store additional information extracted from the contact source to a file or database, such as information storage 250. If there are additional contact sources to input, contact aggregation function 220 may repeat the process for each additional contact source.

If contact aggregation function 220 determines that the contact is potentially directed to the same user as another contact from another contact source (decision 350, yes branch), contact aggregation function 220 may determine whether or not to merge the two contacts into a single user profile graph object, or a single contact directing to both contact sources (decision 360). In some embodiments, contact aggregation function 220 may automatically make this determination (decision 360) based on the evaluation of the contacts using the list of one or more contact reconciliation rules (see steps 330-350). In other embodiments, contact aggregation function 220 may notify the conflict to the user, through a computing device, such as client computing device 30. For example, if there is a conflict, contact aggregation function 220 may cause the two profiles to be displayed on UI 110 of client computing device 30, and query the user for a determination on whether to merge the contacts. In either embodiment, if contact aggregation function 220 determines that the contacts should not be merged (decision 360, no branch), contact aggregation function 220 adds the contact link to the user profile graph (step 380) and stores the information to a file or database, such as information storage 250. In one embodiment, contact aggregation function 220 may store additional information extracted from the contact source to a file or database, such as information storage 250. If there are additional contact sources to input, contact aggregation function 220 may repeat the process for each additional contact source.

If contact aggregation function 220 determines that the contacts should be merged (decision 360, yes branch), contact aggregation function 220 will merge the information into a single contact, add the contact link to the user profile graph, and store the contact link to the user profile graph (step 370). Merging contacts may comprise including multiple contact links for a single contact, wherein each contact link is directed at a different contact source (e.g., email, social network, professional network, etc.). In some embodiments, contact aggregation function 220 may extract information from the contact source to be stored. In such an embodiment, contact aggregation function 220 may store extracted information under a single contact, contact aggregation function 220 may delete duplicate information, and contact aggregation function 220 may alert a user at client computing device 30 as to any information that does not match (e.g., different birthdays listed, different geographic locations, etc.) and may allow the user to specify the conflicting information to consider as primary. Contact aggregation function 220 may store the information to a file or database, such as information storage 250. In one embodiment, contact aggregation function 220 may store additional information extracted from the contact source to a file or database, such as information storage 250. If there are additional contact sources to input, contact aggregation function 220 may repeat the process for each additional contact source.

Contact aggregation function 220, or another function of social services program 210 may allow a user to select primary contact methods for a contact, such as a contact added to the user profile graph. For instance, a contact may contain one or more email addresses, telephone numbers, social network usernames, or other methods by which the contact may be accessed, and a user may be aware of how the user prefers to be contacted. In such a scenario, social services program 210 may allow the user to specify messaging preferences for individual contacts, and store those preferences to a file or database, such as information storage 250.

Figure 4:
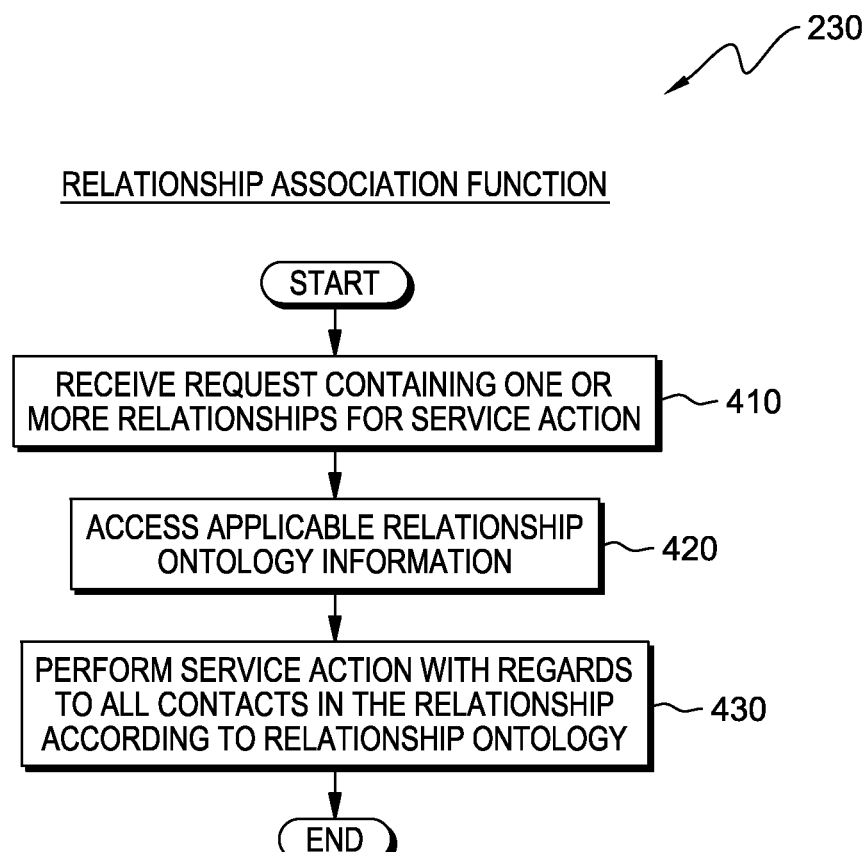
FIG. 4 depicts a flowchart of the steps of a social services program executing a relationship association function within the computing system of FIG. 1, for establishing relationships between contacts, and performing service actions using contact information, established relationships, and inferences based on established relationships.

FIG. 4 depicts a flowchart of the steps of relationship association function 230 executing within the computing system of FIG. 1, for associating relationship axioms with contact aggregates and assisting enterprise services in performing actions and services by using contact aggregates, in accordance with one embodiment of the present invention. In some embodiments, relationship association function 230 may assist in the performance of service actions by using established relationships among contact aggregates, and/or queries using inferences by referencing indirect relationships and/or associated relationship axioms to determine membership of contact aggregates within the queried relationship.

In one embodiment, initially, a user at client computing device 30 may use UI 110 to connect to a server, such as ISP/telecommunications server 40, and extract contact information from identified sources of social networking. At any point after generating such a group of contact aggregates and associating relationship axioms, the user may connect to a server, such as server 50, to gain access to services, such as enterprise services 130. Enterprise services 130 may be any type of computing or online services offered by enterprises with an online presence. For example, enterprise services 130 may include Internet retail and commerce, messaging and communications, gaming, video, or any other type of online service. Assuming server 50 has installed or otherwise has access to interoperable social services, such as interoperable social services 120B, relationship association function 230 may be used, by referencing relationships, either associated or indirect and inferred, as a part of the usage of the enterprise services 130. For example, an enterprise service "shopFor" may take "sibling" as parameter for a user such that the item(s) that the user purchases with the enterprise service "shopFor" will be delivered to all his or her siblings.

In step 410, relationship association function 230 receives a request to assist with a service action, such as a service action available from enterprise services 130, where the request contains a relationship. For example, a request for enterprise services 130 may be to "buy and send one copy of 'book' to my brothers." In such a situation, relationship association function 230 shall determine all contacts that comprise the group "brothers," and in addition may supply enterprise services 130 with address or other contact information for each member of the group "brothers." The relationship specified may be a relationship that was specifically designated by a user, however, it may also be a relationship that must be inferred. For instance, if a user has designated a contact as his or her brother, an inference can be made by relationship association function 230 that the user's brother is also his or her sibling.

When a specified relationship is not one which has been specifically designated, but rather one that relationship association function 230 must infer, relationship association function 230 may access applicable relationship ontology information (step 420). Relationship ontology information may be stored to files or databases, such as relationship ontology file(s) 240. In exemplary embodiments, relationship ontology file(s) 240 are URL addressable and may be accessed by any user, computing device, or entity with access to the Internet. In some embodiments, relationship ontology file(s) 240 may be stored using the web ontology language (OWL). OWL is a format that can be used to define an ontology. OWL can define relatively rich semantics including relations between classes of entities, properties, and characteristics of properties. Relationship ontology information may be used to describe any types of relationships, such as the relationship previously described, and enterprises may include additional ontology files in order to enhance their service offerings. For example, a familial relationship ontology file may include that a mother is a parent, immediate family member, relation, woman, has child, etc. Relationship association function 230 may use such details to make inferences based on disclosed relationships.

In step 430, relationship association function 230 performs the service action with regards to all contacts within the group that comprises the specified relationship. Typically the service action will include retrieving contacts in a group defined by relationships, causing messages to be sent to users within a social networking platform, or other similar actions that may assist the requesting enterprise service, such as enterprise services 130. Contacts in the specified relationship may be based on specifically designated relationships, or relationships that relationship association function 230 has inferred by accessing applicable relationship ontology file(s) (see step 420). In some embodiments, the entity or enterprise performing the service or action may request that relationship association function 230 use contact information located on a previously created user profile graph, which may contain links to contact sources, to connect to the contact source to retrieve additional or updated information, using received user credentials, in a similar manner as discussed with regards to contact aggregation function 220 and FIG. 3. For example, the enterprise service action may include sending a package to a desired contact or set of contacts, and enterprise services 130 may request that relationship association function 230 connect to the contact source to verify the address information for a particular contact. In another example, enterprise services 130 may request that relationship association function 230 send an article to all friends that have an interest in "rock climbing," and relationship association function 230 may connect to the respective contact sources, such as social networking server 60, to find contacts within the designated relational group "friends" that list rock climbing as an interest or somewhere else on their respective profile. In one embodiment, relationship association function 230 may retrieve relationship and contact information stored to information storage 250 using a SPARQL protocol and RDF query language (SPARQL) query. A SPARQL query allows for retrieval of data stored in resource description framework (RDF) format. RDF format allows for a method for conceptual description or modeling of information that is implemented in web resources, using a variety of syntax notations and data serialization formats.

In one embodiment, relationship association function 230 may be used to transfer groups of contacts, or entire lists of contacts, such as those included within a user profile graph, and stored to information storage 250. Relationship association function 230 may transfer contacts and/or contact information from one server to another server, assuming both servers are equipped with interoperable social services. For example, a user may have input contacts using interoperable social services 120A on ISP/telecommunications server 40, and may desire to take advantage of services, such as enterprise services 130, offered by server 50. In order to accomplish this, the user may direct relationship association function 230 to transfer all of, or a selection of the user profile graph, or other stored contact information to interoperable social services 120B. In one embodiment, a user may specify a group of contacts to be transferred, such as family, friends, neighbors, or co-workers.

A function of social services program 210, such as relationship association function 230 may allow a user to associate a relationship axiom between contacts, groups of contacts, and/or the user. A function of social services program 210 may allow a user to define familial (e.g., brother, parent, cousin), employment (e.g., boss, co-worker, business partner), service (e.g., barber, lawyer), geographic (e.g., neighbor, lake house), and other types of relationships between the user and contact, or between contacts themselves. Once set, a query for a list of contact aggregates via an indirect relationship (e.g. "Relatives") will list the contact aggregates according to the information contained in the applicable relationship ontology. A relationship ontology may contain a relationship and sub-levels of the relationship that may establish other indirect relationships. In one embodiment, a user at client computing device 30 may be able to define associated relationship axioms through UI 110 via a connection to interoperable social services, such as interoperable social services 120A or interoperable social services 120B across network 20. In one embodiment, the list of relationships available for association within UI 110 is populated according to an axiom artifact file. The axiom artifact file may contain the list of relationships stored within the applicable relationship ontology from the one or more relationship ontologies as stored to relationship ontology file(s) 240. In one embodiment, relationship association function 230 may be able to cause contact aggregation function 220 to extract relationship-type information that has already been established by a user on the social network or other contact source platform or site. Relationships information may be stored as a part of the user profile graph, or with other extracted contact information. Relationships may be stored to a file or database, such as information storage 250. Relationships and relationship information may be accessible to relationship association function 230 and social services program 210.

Figure 5:
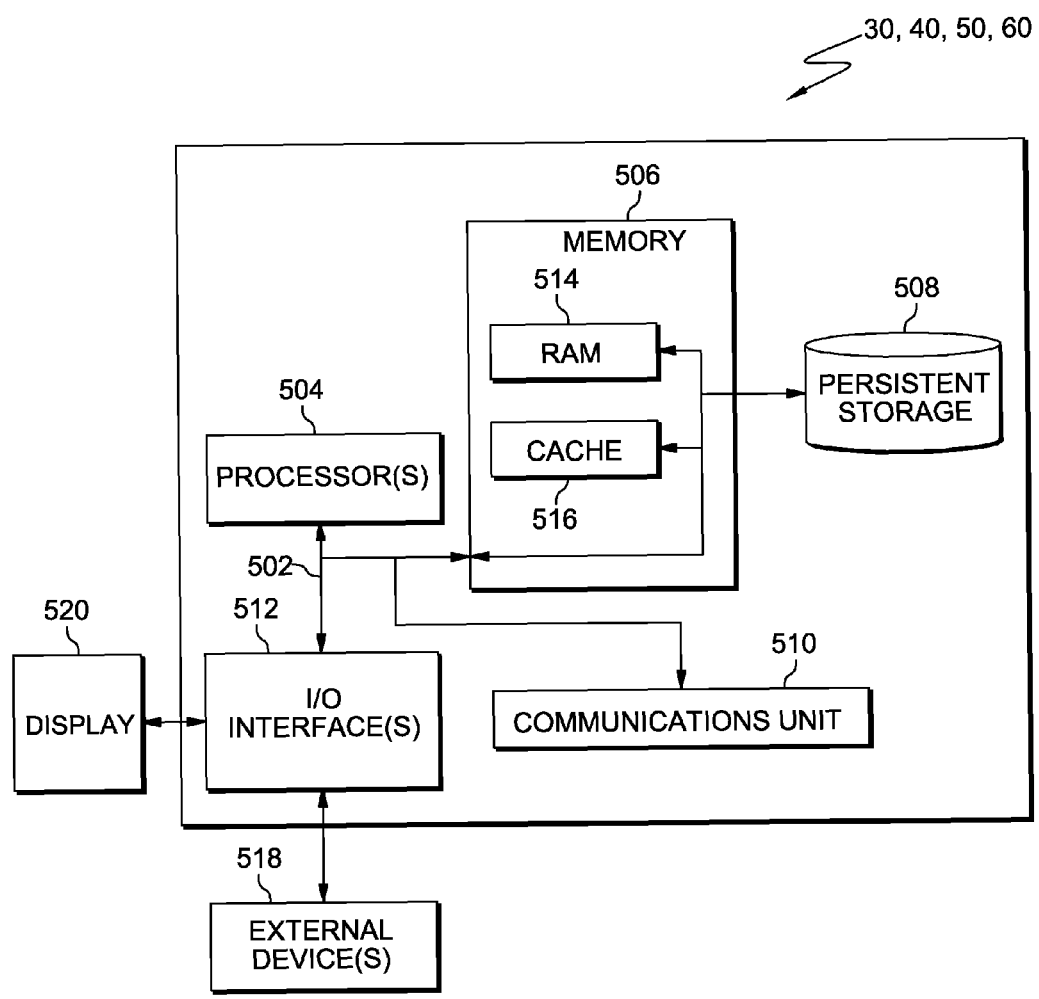
FIG. 5 depicts a block diagram of components of the client computing device, internet service provider (ISP)/telecommunications server, social networking server, and server of FIG. 1 in accordance with one embodiment of the present invention.

FIG. 5 depicts a block diagram of components of client computing device 30, internet service provider (ISP)/Telecommunications server 40, server 50, and social networking server 60 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Client computing device 30, ISP/telecommunications server 40, and server 50 each include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Interoperable social services 120A is stored in persistent storage 508 of internet service provider (ISP)/telecommunications server 40 for execution and/or access by one or more of the respective computer processors 504 of ISP/telecommunications server 40 via one or more memories of memory 506 of ISP/telecommunications server 40. Enterprise services 130 and interoperable social services 120B are stored in persistent storage 508 of server 50 for execution and/or access by one or more of the respective computer processors 504 of server 50 via one or more memories of memory 506 of server 50. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Interoperable social services 120A may be downloaded to persistent storage 508 of ISP/telecommunications server 40 through communications unit 510 of ISP/telecommunications server 40. Enterprise services 130 and interoperable social services 120B may be downloaded to persistent storage 508 of server 50 through communications unit 510 of server 50.

I/O interface(s) 512 allows for input and output of data with other devices that may be connected to computing system 10. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., interoperable social services 120A, can be stored on such portable computer-readable storage media and can be loaded onto persistent storage 508 of ISP/telecommunications server 40 via I/O interface(s) 512 of ISP/telecommunications server 40. Software and data used to practice embodiments of the present invention, e.g., enterprise services 130 and interoperable social services 120B, can be stored on such portable computer-readable storage media and can be loaded onto persistent storage 508 of server 50 via I/O interface(s) 512 of server 50. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for utilizing multiple social computing services of a user, the method comprising:

accessing a first networking service of a user and a second networking service of the user, wherein the first networking service includes a first group of contacts connected with the user and the second networking service includes a second group of contacts connected with the user;

retrieving the first group from the first networking service and the second group from the second networking service;

creating, by one or more processors, a set of contacts, wherein the set of contacts includes each contact of the first group of contacts with a corresponding link to information about that contact, and each contact of the second group of contacts with a corresponding link to information about that contact, wherein at least one corresponding link to information about a respective contact includes interest information about the respective contact, and wherein a contact of the set of contacts has an associated relationship with the user that is established externally from and independently from the first networking service and the second networking service;

receiving a request for an action to be executed, wherein the action includes a required relationship between the user and one or more contacts of the set of contacts and a required interest, and wherein the action is external from the first networking service and the second networking service;

determining, by one or more processors, the one or more contacts that have the required relationship with the user and the required interest; and causing, by one or more processors, the action to be executed based on the determined one or more contacts.

2. The method of claim 1, wherein the first group includes a first contact corresponding to a first person and the second group includes a second contact corresponding to the first person, and where the method further comprises:

determining, by the one or more processors, that the first contact and the second contact correspond to the first person; and merging the first contact and the second contact into a single contact in the set of contacts.

3. The method of claim 2, wherein the step of merging the first contact and the second contact into a single contact in the set of contacts further comprises:

maintaining a corresponding link to information about the first contact and a corresponding link to information about the second contact.

4. The method of claim 1, wherein the associated relationship with the user is selected from relationships listed in a set of ontology information, wherein the ontology information includes a set of concepts used to describe relationships generally.

5. The method of claim 1, further comprising:

determining, by the one or more processors, an inferred relationship between the user and at least one contact of the set of contacts based on at least the associated relationship.

6. The method of claim 5, wherein the step of determining, by the one or more processors, an inferred relationship between the user and at least one contact of the set of contacts based on at least the associated relationship comprises:

accessing ontology information, wherein the ontology information includes a set of concepts used to describe relationships generally; and determining, by the one or more processors, the inferred relationship between the user and the at least one contact of the set of contacts based on at least the associated relationship as described in the ontology information.

7. The method of claim 1, wherein the action comprises externalizing a copy of at least a portion of the set of contacts from a first location managed by a first enterprise to a second location managed by a second enterprise.

* * * * *